United States Patent
Frohne et al.

(10) Patent No.: US 7,617,708 B2
(45) Date of Patent: Nov. 17, 2009

(54) IGNITION LOCK FOR A MOTOR VEHICLE AND METHOD OF OPERATING AN IGNITION LOCK SYSTEM

(75) Inventors: Hans-Joachim Frohne, Lehre (DE); Ralf Borngräber, Lehre (DE); Steffen Buhl, Meβstetten (DE); Dennis Meβmer, Trossingen (DE); Thomas Schwarz, Wurmlingen (DE)

(73) Assignees: Volkswagen AG, Wolfsburg (DE); Marquardt GmbH, Rietheim-Weilheim (DE)

( * ) Notice: Subject to any disclaimer, the term of this patent is extended or adjusted under 35 U.S.C. 154(b) by 282 days.

(21) Appl. No.: 11/495,025

(22) Filed: Jul. 28, 2006

(65) Prior Publication Data

US 2008/0028807 A1 Feb. 7, 2008

(51) Int. Cl.
*B60R 25/02* (2006.01)
(52) U.S. Cl. ............................... 70/252; 70/361; 70/387; 70/389
(58) Field of Classification Search ........... 70/182–186, 70/252, DIG. 30, 387, 389, 390, 247, 360, 70/361, 277, 278.2, 278.3, 278.7, 279.1, 70/283.1; 180/287; 307/10.2–10.6; 340/5.7, 340/5.72, 5.31, 426.11, 426.12, 426.3
See application file for complete search history.

(56) References Cited

U.S. PATENT DOCUMENTS

| | | | | |
|---|---|---|---|---|
| 1,726,202 A | * | 8/1929 | Tibbetts | 70/255 |
| 3,943,737 A | * | 3/1976 | Lerro | 70/106 |
| 4,318,288 A | * | 3/1982 | Rifat | 70/252 |
| 4,611,477 A | * | 9/1986 | Crites | 70/416 |
| 5,714,807 A | * | 2/1998 | Albanes | 307/10.2 |
| 6,260,651 B1 | * | 7/2001 | Kokubu et al. | 180/287 |
| 6,546,768 B1 | | 4/2003 | Burghoff et al. | |
| 6,756,698 B2 | * | 6/2004 | Shamoto et al. | 307/10.6 |
| 6,776,016 B1 | * | 8/2004 | Wittwer et al. | 70/252 |
| 6,796,153 B2 | * | 9/2004 | Ochi | 70/186 |
| 7,023,318 B1 | | 4/2006 | Geiger et al. | |
| 7,334,441 B1 | * | 2/2008 | Amundson et al. | 70/252 |
| 7,392,675 B2 | * | 7/2008 | Kito | 70/252 |
| 2003/0172695 A1 | * | 9/2003 | Buschmann | 70/361 |
| 2005/0034493 A1 | * | 2/2005 | Wittwer et al. | 70/186 |
| 2007/0199355 A1 | * | 8/2007 | Feigl | 70/252 |

FOREIGN PATENT DOCUMENTS

DE 103 53 195 A1 8/2004

* cited by examiner

Primary Examiner—Lloyd A Gall
(74) Attorney, Agent, or Firm—Manfred Beck, P.A.

(57) ABSTRACT

An ignition lock for a motor vehicle includes a carrier element for holding an ignition key that is inserted in the ignition lock. The carrier element is movable along a longitudinal axis of the ignition lock. The carrier element pushes a slide bar from a blocking position to an unblocking position when the carrier element moves along the longitudinal axis. A latch bar, when in its latching position, restricts a movement of the carrier element along the longitudinal axis and, when in its unlatching position, allows the carrier element to move along the longitudinal axis. When the latch bar is in its unlatching position and the slide bar is in its blocking position, the slide bar prevents the latch bar from moving from the unlatching position to the latching position.

12 Claims, 11 Drawing Sheets

IGNITION LOCK FOR A MOTOR VEHICLE AND METHOD OF OPERATING AN IGNITION LOCK SYSTEM

BACKGROUND OF THE INVENTION

Field of the Invention

The invention relates to an ignition lock for a motor vehicle and to a method of operating an ignition lock system for a motor vehicle.

Various motor vehicle safety standards specify requirements for ignition locks in motor vehicles. These motor vehicle safety standards have been implemented for example for the purpose of preventing a removal of the ignition key from the ignition lock when the transmission in a forward or reverse drive position and also for the purpose of preventing a engine starter engagement by the driver when the transmission is in a drive position.

Also, if a motor vehicle has a transmission control which incorporates a parking mechanism, then the parking mechanism must be engaged before the ignition key can be removed. A parking mechanism is in this case a component or subsystem of the drive train that locks the drive train when the transmission control is placed in a parking gear position or a corresponding other gear position and the ignition key is removed.

In accordance with another aspect of vehicle safety standards, warning indicators such as audible signals or warning lights may be activated if there is a malfunction of a vehicle system, for example a malfunction of the brake system, and the ignition switch is in an "on" position.

The above-described safety standards make it necessary to securely prevent a removal of the ignition key under certain operating conditions of the motor vehicle. Conventional ignition lock systems with an ignition switch that can turn to different positions are configured such that the ignition key can only be inserted and removed from the ignition switch, when the ignition switch is in a "lock" position. After the ignition key is inserted into the ignition switch and the ignition switch is turned from the "lock" position to the "on" position, the ignition key is securely held in the ignition lock and cannot be removed. The ignition key is in this case held in the ignition switch due to the mechanical interaction between the keybit of the ignition key and the lock of the ignition switch.

Increasingly, electronic ignition lock systems are used in motor vehicles. The ignition keys for electronic ignition locks no longer have keybits that hold the ignition keys securely in the ignition lock when the ignition lock is in the "on" state and therefore alternative methods of preventing an accidental removal of the electronic ignition key from the electronic ignition lock are necessary.

U.S. Pat. No. 7,023,318 B1 discloses an electronic ignition lock system for a motor vehicle. An electronic ignition key can be inserted into the ignition lock and can be turned similar to a traditional mechanical ignition key. A blocking slide is provided for preventing the electronic ignition key from being removed when the electronic ignition lock is in the "on" position. The electronic ignition key can only be removed from the electronic ignition lock after the electronic ignition key has been turned to the starting position or "off" position.

U.S. Pat. No. 6,546,768 B1 discloses a further electronic ignition lock system for motor vehicles. An electronic ignition key can be inserted into the ignition lock and can be turned similar to a traditional mechanical ignition key. A mechanical blocking device prevents the electronic ignition key from being removed when the electronic ignition lock is in the "on" position or "use" position. Under normal operating conditions, the electronic ignition key can only be removed from the electronic ignition lock after the electronic ignition key has been turned to the starting position or "off" position. The electronic ignition lock is configured such that the electronic ignition key is mechanically damaged if an operator tries to pull out the electronic ignition key while it is in the "on" position. For example, the electronic ignition key may break at a predetermined breaking point if it is pulled out of the electronic ignition lock while the electronic ignition key is still in the "on" position. The mechanical damage to the electronic ignition key indicates that there has been an unauthorized manipulation of the electronic ignition lock system.

German Patent Application Publication No. DE 103 53 195 A1 discloses a further electronic ignition lock system for a motor vehicle. The electronic ignition lock has a carrier element with a receptacle for accepting an electronic key. The electronic key can be pushed into the electronic ignition lock and moves along a linear path corresponding to the pushing movement. The carrier element, which holds the electronic key, moves together with the electronic key along a straight path. The electronic key can move between a starting position, which for example corresponds to an "off" position, and movement positions, which for example correspond to "on" positions. The various positions of the electronic key are facilitated by moving a latching pin in a heart-shaped guiding groove. The latching pin is connected to the carrier element such that it is movable in a direction transverse to the movement path of the carrier element.

An electronic code can be exchanged between the electronic key and the electronic ignition lock. At least one function can be enabled or triggered by the electronic ignition lock after a positive evaluation of the electronic code. The electronic ignition lock may for example activate vehicle subsystems or may start the vehicle engine. The carrier element can move linearly in the manner of a sliding element and the carrier element has a first movement position and at least one second movement position that form latching or locking positions.

The carrier element has a spring-loaded locking lever for holding the electronic key in the electronic ignition lock when the carrier element and the electronic key are in one of the movement positions which correspond to "on" positions. The spring-loaded locking lever has a cam that protrudes such that it engages in a corresponding recess formed in the electronic key when the electronic key and correspondingly the carrier element, which holds the electronic key, are in a movement position. The spring-loaded locking lever ensures that the electronic key cannot be removed when the electronic key is in an "on" position. A disadvantage of this ignition lock system is that the protection against an accidental removal of the ignition key may not meet the requirements of motor vehicle safety standards which require a positive mechanical locking of the ignition key in the ignition lock.

SUMMARY OF THE INVENTION

It is accordingly an object of the invention to provide an ignition lock for a motor vehicle and a method for operating an ignition lock system which overcome the above-mentioned disadvantages of the heretofore-known ignition lock systems of this general type and which comply with motor vehicle safety standards and which ensure a reliable and efficient operation of the ignition lock.

With the foregoing and other objects in view there is provided, in accordance with the invention, an ignition lock including:

an ignition lock housing;

a carrier element disposed in the ignition lock housing and configured to hold an ignition key, the ignition lock housing defining a longitudinal axis, the carrier element being movable along the longitudinal axis;

a slide bar disposed in the ignition lock housing, the slide bar being movable in a direction transverse to the longitudinal axis, e.g. substantially perpendicular to the longitudinal axis, between a blocking position and an unblocking position, the carrier element and the slide bar being configured such that the carrier element displaces, i.e. pushes, the slide bar from the blocking position to the unblocking position when the carrier element moves along the longitudinal axis;

a latch bar disposed in the ignition lock housing, the latch bar being movable in a direction transverse to the longitudinal axis, e.g. substantially perpendicular to the longitudinal axis, between a latching position and an unlatching position, the carrier element and the latch bar being configured such that the latch bar, when in the latching position, restricts a movement of the carrier element along the longitudinal axis, and the latch bar, when in the unlatching position, releases the carrier element allowing the carrier element to move along the longitudinal axis; and the latch bar and the slide bar being configured such that when the latch bar is in the unlatching position and the slide bar is in the blocking position, the slide bar prevents the latch bar from moving from the unlatching position to the latching position.

By combining the latch bar and the slide bar in the above-defined manner, it is possible to securely prevent a removal of the ignition key when the ignition lock is in a state that does not allow the removal of the ignition key.

According to another feature of the invention, the carrier element has at least a first position and a second position along the longitudinal axis, the carrier element moves from the first position to the second position when the ignition key is inserted into the ignition lock; and the carrier element and the slide bar each have a cam surface, the cam surface of the carrier element contacts the cam surface of the slide bar when moving from the first position to the second position and pushes the slide bar from the blocking position to the unblocking position for allowing the latch bar to move from the unlatching position to the latching position.

According to yet another feature of the invention, the slide bar is a spring-loaded slide bar exerting a spring force in a direction from the unblocking position to the blocking position; and the latch bar is a spring-loaded latch bar exerting a spring force in a direction from the unlatching position to the latching position. An advantage of providing a spring force in the direction of the latching position is that no electric energy is needed to keep the latch bar in its latching position. The ignition lock therefore saves energy because no electric current is needed to lock the ignition key in the ignition lock.

According to a further feature of the invention, an electromagnet is disposed at the latch bar; the electromagnet is configured as a lifting magnet for moving the latch bar from the latching position to the unlatching position.

According to a further feature of the invention, the ignition lock housing defines an X-axis, a Y-axis and a Z-axis respectively substantially perpendicular to one another, the longitudinal axis coincides with the X-axis; the carrier element is movable in a direction parallel to the X-axis, the slide bar is movable in a direction parallel to the Y-axis between the blocking position and the unblocking position, the latch bar is movable in a direction parallel to the Z-axis between the latching position and the unlatching position; and the slide bar and the latch bar each have a lateral arm, the lateral arm of the slide bar obstructs a movement path of the lateral arm of the latch bar when the slide bar is in the blocking position for preventing the latch bar from moving from the unlatching position to the latching position.

According to yet a further feature of the invention, the ignition lock housing defines an X-axis, a Y-axis and a Z-axis respectively substantially perpendicular to one another, the longitudinal axis coincides with the X-axis; the carrier element is movable in a direction parallel to the X-axis, the slide bar is movable in a direction parallel to the Y-axis between the blocking position and the unblocking position, the latch bar is movable in a direction parallel to the Z-axis between the latching position and the unlatching position; and the latch bar forms a force-locking connection or a form-locking connection with the carrier element, when the latch bar is in the latching position and abuts against the carrier element.

According to another feature of the invention, the latch bar has a tooth and the carrier element has a locking cam formed with a groove; and the tooth of the latch bar engages in the groove of the locking cam for providing a form-locking connection between the latch bar and the carrier element when the latch bar is in the latching position and abuts against the carrier element.

According to a further feature of the invention, the latch bar and the carrier element each have a substantially flat contact surface, the contact surface of the latch bar and the contact surface of the carrier element extend substantially parallel to one another and lie flat against one another when the latch bar is in the latching position and the latch bar abuts against the carrier element; and the contact surface of the latch bar and the contact surface of the carrier element extend substantially parallel to the Y-axis and a normal on the contact surface of the latch bar is at a given angle to the X-axis, the given angle being at most a self-locking angle selected such that the latch bar, when in the latching position and abutting against the carrier element, forms a force-locking connection with the carrier element and the carrier element cannot exert a lifting force in a direction parallel to the Z-axis on the latch bar.

With the objects of the invention in view there is also provided, an ignition lock including:

an ignition lock housing;

a carrier element disposed in the ignition lock housing and configured to hold an ignition key, the ignition lock housing defining a longitudinal axis, the carrier element being movable along the longitudinal axis;

a latch bar disposed in the ignition lock housing, the latch bar being movable in a direction transverse to the longitudinal axis, e.g. substantially perpendicular to the longitudinal axis, between a latching position and an unlatching position, the carrier element and the latch bar being configured such that the latch bar, when in the latching position, restricts a movement of the carrier element along the longitudinal axis, and the latch bar, when in the unlatching position, releases the carrier element allowing the carrier element to move along the longitudinal axis; and the latch bar and the carrier element each having a substantially flat contact surface, the contact surface of the latch bar and the contact surface of the carrier element extending substantially parallel to one another and lying flat against one another when the latch bar is in the latching position and abuts against the carrier element;

the contact surface of the latch bar is provided such that a normal on the contact surface of the latch bar is at a given angle to the longitudinal axis, the given angle being at most a self-locking angle selected such that the latch bar, when in the latching position and abutting against the carrier element, forms a force-locking connection with the carrier element such that the carrier element cannot force the latch bar from the latching position to the unlatching position.

According to another feature of the invention, the contact surface of the latch bar and the contact surface of the carrier element define a frictional coefficient; and the contact surface of the latch bar is provided such that the given angle between the longitudinal axis and the normal on the contact surface of the latch bar is at most the arcustangens of the frictional coefficient.

With the objects of the invention in view there is also provided, a method of operating an ignition lock system that includes the steps of:

providing an ignition lock including an ignition lock housing;
providing an ignition key configured to be inserted into the ignition lock;
providing a carrier element disposed in the ignition lock housing, the ignition lock housing defining a longitudinal axis, the carrier element being movable along the longitudinal axis, the ignition key moving together with the carrier element along the longitudinal axis when the ignition key is inserted into the ignition lock;
providing a slide bar disposed in the ignition lock housing, the slide bar being movable in a direction transverse to the longitudinal axis, e.g. substantially perpendicular to the longitudinal axis, between a blocking position and an unblocking position, the carrier element and the slide bar being configured such that the carrier element displaces the slide bar from the blocking position to the unblocking position when the carrier element moves along the longitudinal axis;
providing a latch bar disposed in the ignition lock housing, the latch bar being movable in a direction transverse to the longitudinal axis, e.g. substantially perpendicular to the longitudinal axis, between a latching position and an unlatching position, the carrier element and the latch bar being configured such that the latch bar, when in the latching position, restricts a movement of the carrier element along the longitudinal axis, and the latch bar, when in the unlatching position, releases the carrier element allowing the carrier element to move along the longitudinal axis;
the latch bar and the slide bar being configured such that when the latch bar is in the unlatching position and the slide bar is in the blocking position, the slide bar prevents the latch bar from moving from the unlatching position to the latching position;
inserting the ignition key into the ignition lock and moving the carrier element to a first position;
further inserting the ignition key and moving the carrier element from the first position to a second position and displacing the slide bar in a direction transverse to the longitudinal axis by moving the carrier element from the first position to the second position for unblocking the latch bar; and
moving the latch bar from the unlatching position to the latching position by using a spring-loading of the latch bar.

Another mode of the method according to the invention includes supplying an electric current to an electromagnet operating as a lifting magnet for moving the latch bar from the latching position to the unlatching position; and moving the slide bar from the unblocking position to the blocking position by using a spring-loading of the slide bar.

Although the invention is illustrated and described herein as embodied in an ignition lock for a motor vehicle and a method of operating an ignition lock system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
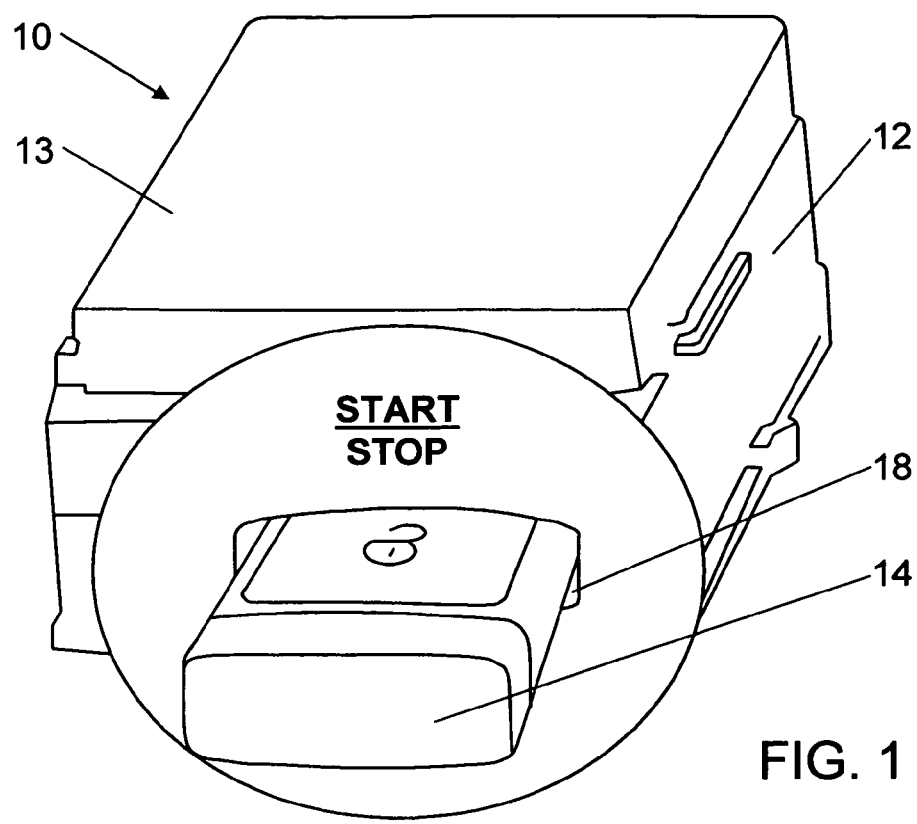
FIG. 1 is a diagrammatic perspective view of an electronic ignition lock system according to the invention.

Referring now to the figures of the drawings in detail and first, particularly, to FIG. 1 thereof, there is shown a diagrammatic perspective view of an electronic ignition lock system 10 according to the invention which includes an electronic ignition lock 12 and an electronic ignition key 14. The electronic ignition key 14 is inserted in the electronic ignition lock 12 through an opening 18 which is formed in the housing 13 of the electronic ignition lock 12. The electronic ignition key 14 is formed without a key bit and is operated by pushing the electronic ignition key 14 as opposed to turning the ignition key as is the case with most conventional ignition keys. For example, the engine of the vehicle can be started by pushing the electronic ignition key 14.

Figure 2:
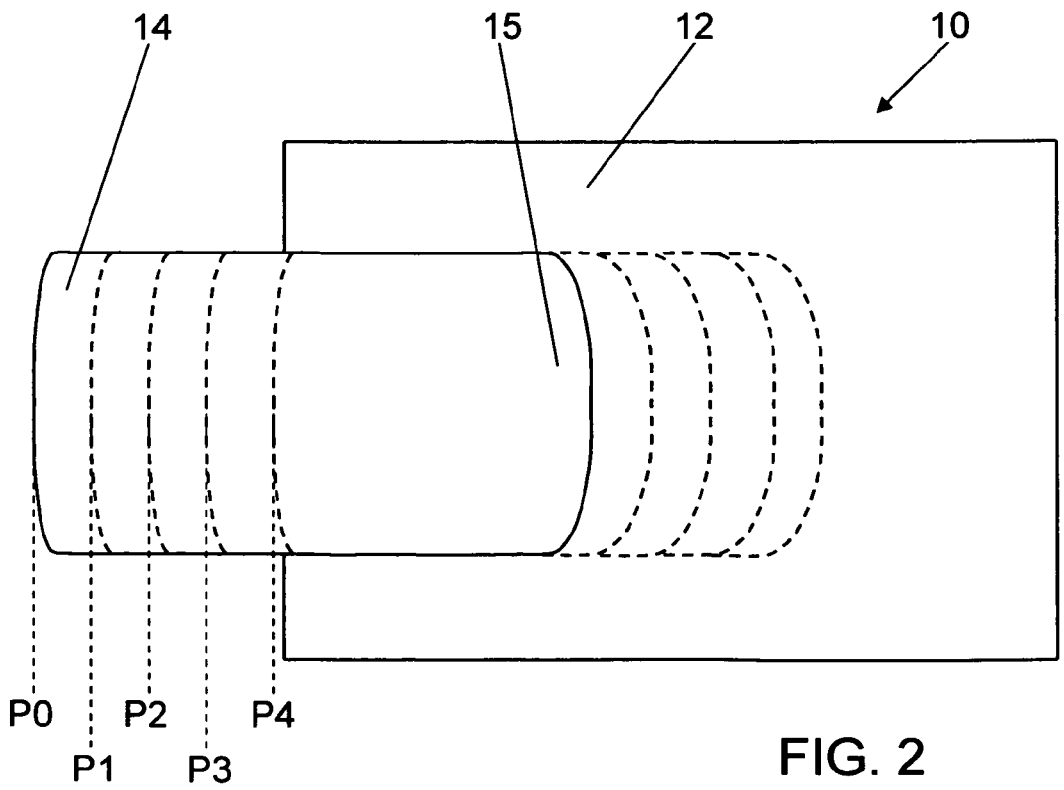
FIG. 2 is a diagrammatic top plan view of the electronic ignition key for illustrating different positions of the electronic ignition key when being inserted into the electronic ignition lock according to the invention.

FIG. 2 is a diagrammatic plan view the electronic ignition key 14 illustrating different positions P0, P1, P2, P3, P4 of the electronic ignition key 14 when being inserted into the electronic ignition lock 12 according to the invention. Position P0 is the "off" position. When the electronic ignition key 14 is in position P1, the so-called "S-contact" position, a user can for example operate the stereo system of the vehicle but cannot operate other devices that need electric power. When the ignition key 14 is inserted further into the electronic ignition lock 12, it reaches position P2, the so-called "terminal 15" position. At this position, electric power is supplied to the electric or electronic systems in the vehicle and it is possible to operate substantially all electric or electronic systems in the vehicle. For example, when the electronic ignition key 14 is in position P2, the user can raise and lower the power windows. Position P3 is the position of the electronic ignition key 14 after the engine of the vehicle has been started. The engine of the vehicle is started by pushing the electronic ignition key 14 to position P4. After starting the engine, the electronic ignition key 14 automatically returns to position P3. An electronic ignition key of the type described above is also called identification transmitter because identification information is transmitted from the ignition key to the electronic ignition lock.

Figure 3:
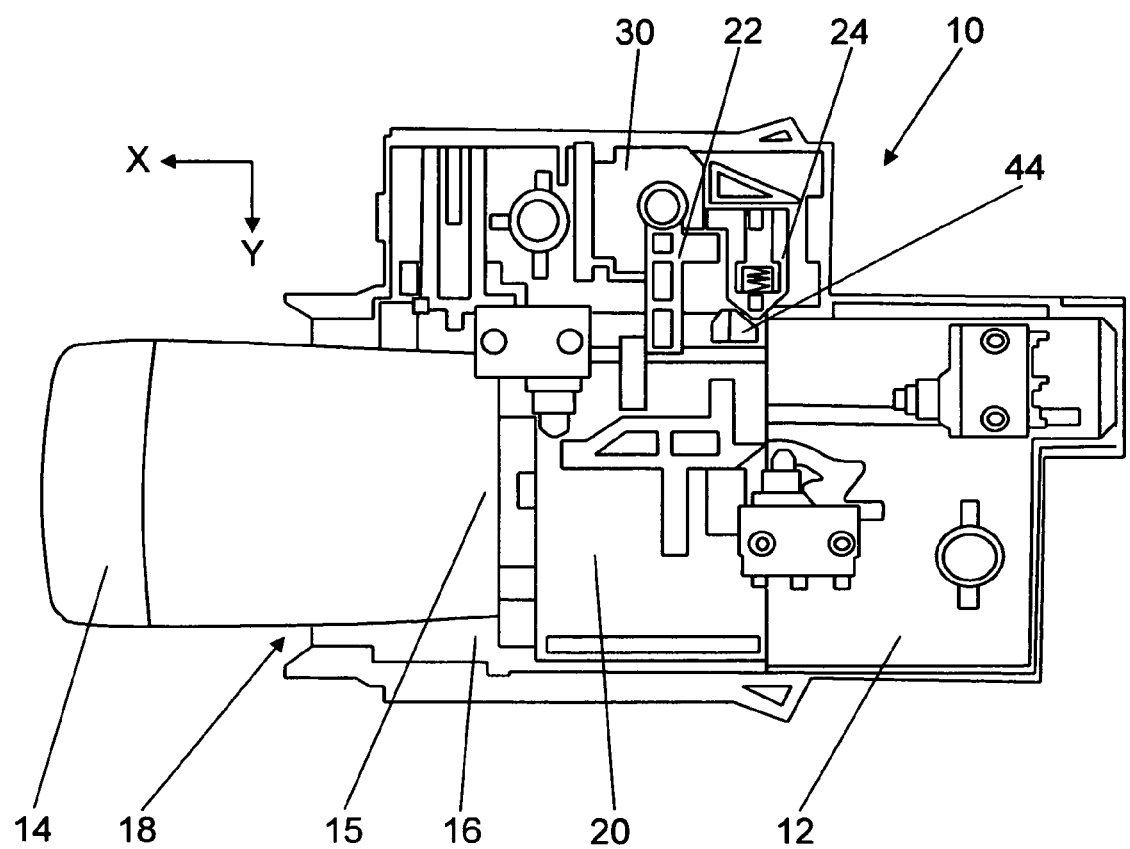
FIG. 3 is a diagrammatic top view of an exemplary embodiment of an electronic ignition lock system according to the invention with an electronic ignition key inserted in the electronic ignition lock.

FIG. 3 is a diagrammatic top view of an electronic ignition lock system 10 according to the invention with an electronic ignition key 14 inserted in the electronic ignition lock 12. The electronic ignition lock 12 is formed as a receptacle 16 for the electronic ignition key 14 such that a front portion 15 of the electronic ignition key 14 can be inserted into the electronic ignition lock 12 through an opening 18 which is formed in the electronic ignition lock 12.

The receptacle 16 holds a carrier element 20 which can move along a linear path (X-axis) in the receptacle 16 formed in the electronic ignition lock 12. The movement direction along the linear path of the carrier element 20 defines a longitudinal axis of the electronic ignition lock 12. FIG. 3 illustrates the longitudinal axis as the X-axis defined by the movement direction of the carrier element 20 in the electronic ignition lock 12. The Y-axis and the Z-axis are respectively transverse to the X-axis. The carrier element 20 is formed such that the front portion 15 of the electronic ignition key 14 fits into the carrier element 20 when the electronic ignition key 14 is inserted into the electronic ignition lock 12. The electronic ignition key 14 is held in the carrier element 20 when it is inserted into the electronic ignition lock 12 and the carrier element 20 can be selectively blocked and released in its movement along the longitudinal axis (X-axis) by a latch bar 22.

When the ignition key 14 is inserted through the opening 18, the ignition key 14 is held in the carrier element 20 and the carrier element 20 moves along with the ignition key 14. The latch bar 22 is configured to move down or up (Z-direction) such that the latch bar 22 moves into and out of the movement path of a locking cam 44 provided on the carrier element 20 in order to block or allow a movement of the carrier element 20 and thus to selectively block or allow a movement of the electronic ignition key 14 along the X-axis. FIG. 3 also shows a slide bar 24 which is movable along the Y-axis.

Figure 4:
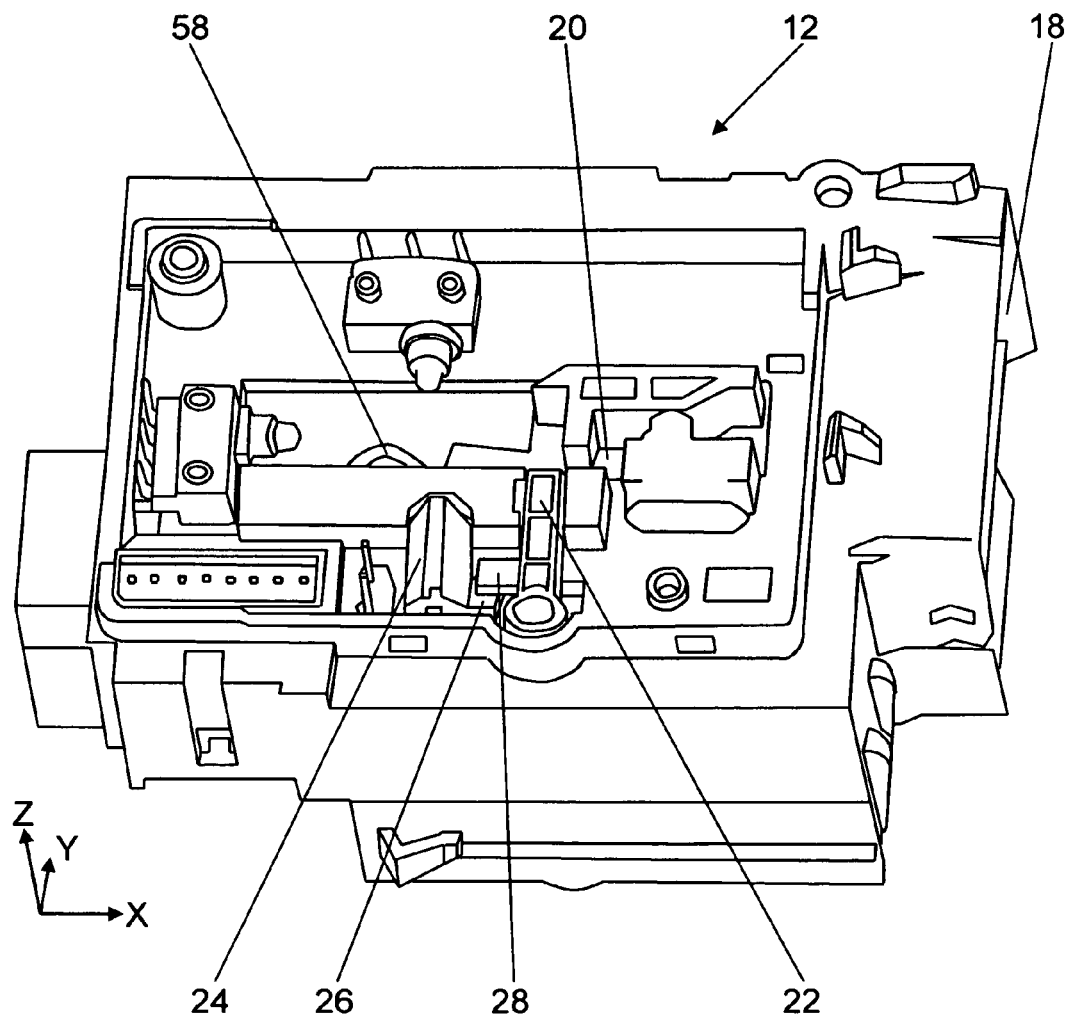
FIG. 4 is a diagrammatic perspective view of a portion of an exemplary embodiment of the electronic ignition lock according to the invention.

FIG. 4 is a diagrammatic perspective view of a portion of the electronic ignition lock 12 according to the invention with the carrier element 20 in a position close to the opening 18 for inserting an electronic ignition key. FIG. 4 shows the slide bar 24 and the latch bar 22. The slide bar 24 has a lateral arm 26 which extends in a direction towards the latch bar 22. The latch bar 22 has a lateral arm 28 which extends towards the slide bar 24. In FIG. 4, the lateral arm 26 of the slide bar 24 is positioned underneath the lateral arm 28 of the latch bar 22 and in this manner the slide bar 24 can block a downward movement (along the Z-axis) of the latch bar 22. The slide bar 24 is movable in a transverse direction along the Y-axis whereas the latch bar 22 is movable along the Z-axis, i.e. it can be raised and lowered with respect to the carrier element 20. An electromagnet 30 operates as a lifting magnet for the latch bar 22. When the latch bar 22 is in a lowered position, the latch bar 22 abuts against a locking cam 44 provided on the carrier element 20 and blocks the movement of the carrier element 20 such that the carrier element 20 cannot be moved towards its end position close to the opening 18. When the latch bar 22 is in a raised position, then the latch bar 22 releases the carrier element 20 and allows a movement of the carrier element 20 toward the opening 18 of the ignition lock 12 and thus allows the ignition key 14 to be removed from the ignition lock 12. The slide bar 24 is displaced in the direction of the Y-axis by a spring force acting on the slide bar 24 and by interacting with the locking cam 44 provided on the carrier element 20. More specifically, a cam surface 36 of the spring-loaded slide bar 24 interacts with a cam surface 32 of the locking cam 44. FIG. 4 shows the carrier element 20 in a pre-latch position. The latch bar 22 is in its raised position with the lateral arm 26 of the slide bar 24 underneath the lateral arm 28 of the latch bar 22 which prevents the latch bar 22 from moving downward into its lowered position (latching position). The latch bar 22 therefore unlocks the carrier element 20 and allows a removal of the ignition key 14 from the ignition lock 14.

Figure 5:
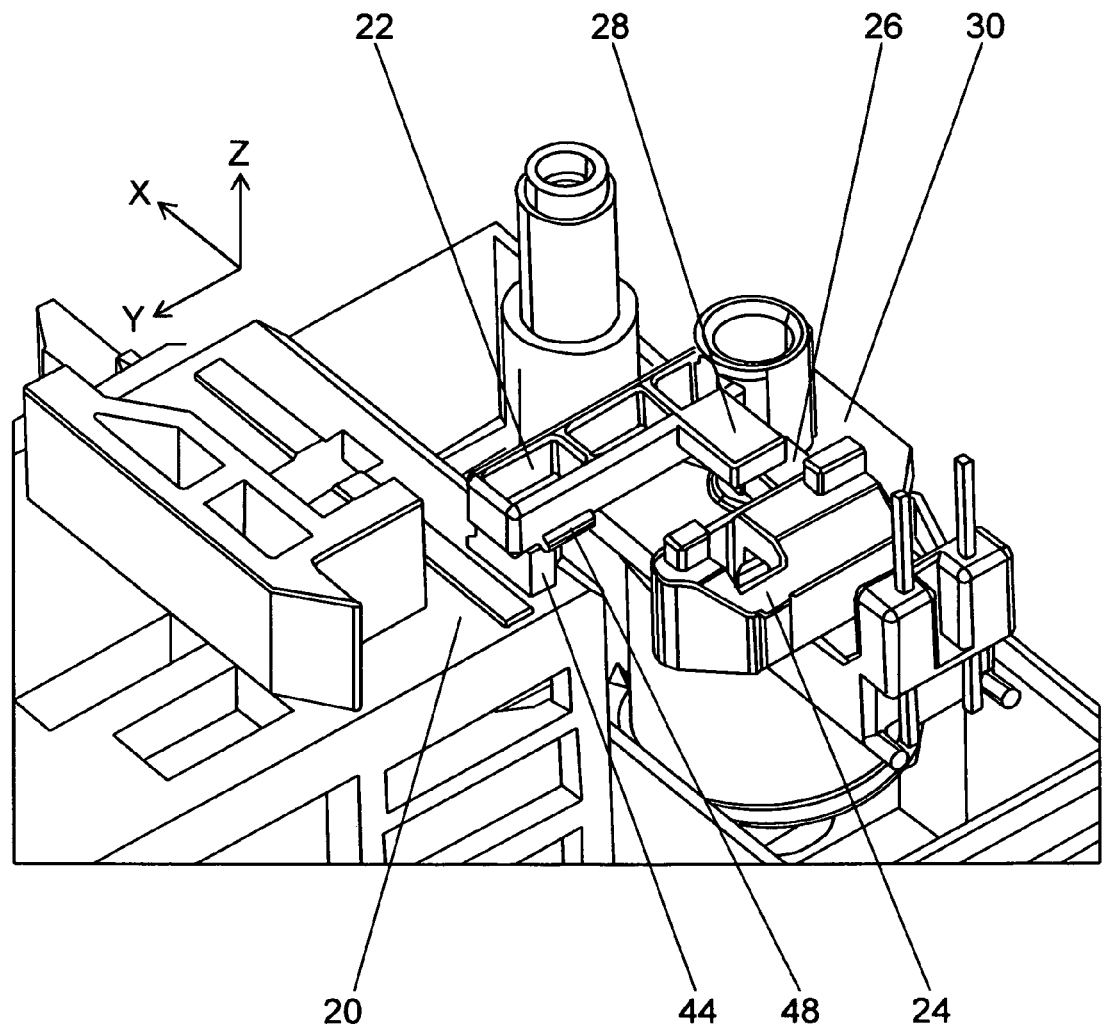
FIG. 5 is a partial diagrammatic perspective view of an exemplary embodiment of the electronic ignition lock according to the invention in a first operating position.

FIGS. 5 to 8 illustrate the movements of the carrier element 20, the latch bar 22, and the slide bar 24 with respect to one another by illustrating the positions of these elements at consecutive points in time. More specifically, FIG. 5 is a partial diagrammatic perspective view of the electronic ignition lock according to the invention in a first operating position, namely in a pre-latch position in which the latch bar 22 is in its unlatching position. As described above, the lateral arm 26 of the slide bar 24 is positioned underneath the lateral arm 28 of the latch bar 22 and blocks a downward movement of the latch bar 22. The latch bar 22 in its unlatching position allows a movement of the locking cam 44 along the X-axis and thus allows a movement of the carrier element 20.

Figure 6:
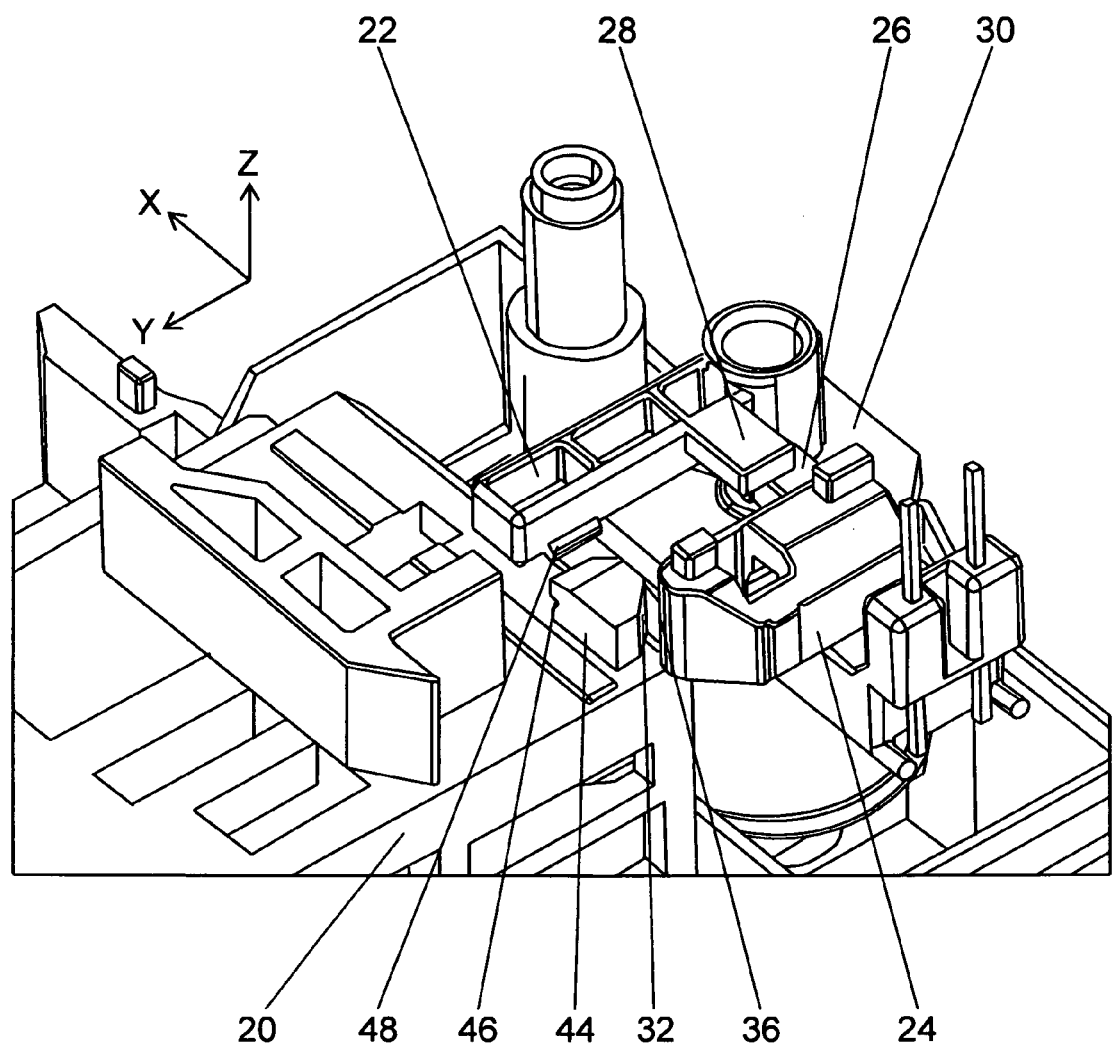
FIG. 6 is a partial diagrammatic perspective view of the electronic ignition lock according to the invention in a second operating position.

FIG. 6 is a partial diagrammatic perspective view of the electronic ignition lock 12 according to the invention in a second operating position. The carrier element 20 is in a position further away from the opening 18 than in FIG. 5. The locking cam 44 has moved past the latch bar 22. The lateral arm 26 of the slide bar 24 is still positioned underneath the lateral arm 28 of the latch bar 22 and blocks a downward movement of the spring-loaded latch bar 22.

Figure 7:
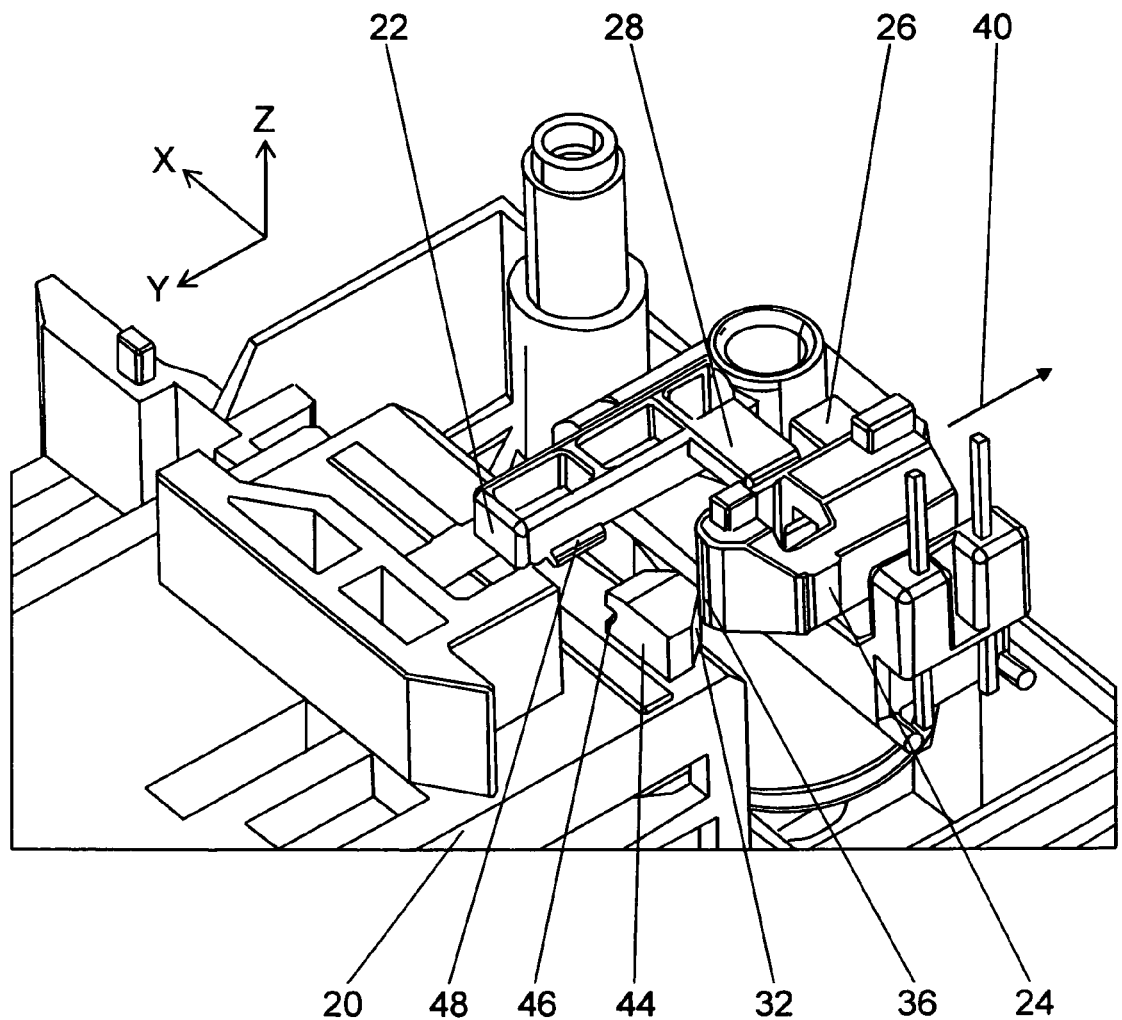
FIG. 7 is a partial diagrammatic perspective view of the electronic ignition lock according to the invention in a third operating position.

FIG. 7 is a partial diagrammatic perspective view of the electronic ignition lock 12 according to the invention in a third operating position with the latch bar 22 in its lowered position. The carrier element 20 has been moved along the X-axis to a position just prior to a position that allows the activation of electric and electronic subsystems of the vehicle. The position of the carrier element 20 that allows the activation of electric and electronic subsystems is also called the "terminal 15 position." The slide bar 24 is displaced because the cam surface 32 of the locking cam 44 interacts with the cam surface 36 of the slide bar 24 and pushes the spring-loaded slide bar 24 against the spring force in the direction of the arrow 40. The lateral arm 26 of the slide bar 24 is no longer positioned underneath the lateral arm 28 of the latch bar 22 and thus the latch bar 22 is no longer held in its raised position. The spring-loaded latch bar 22 is in the lowered position and thus in the movement path of the locking cam 44.

Figure 8:
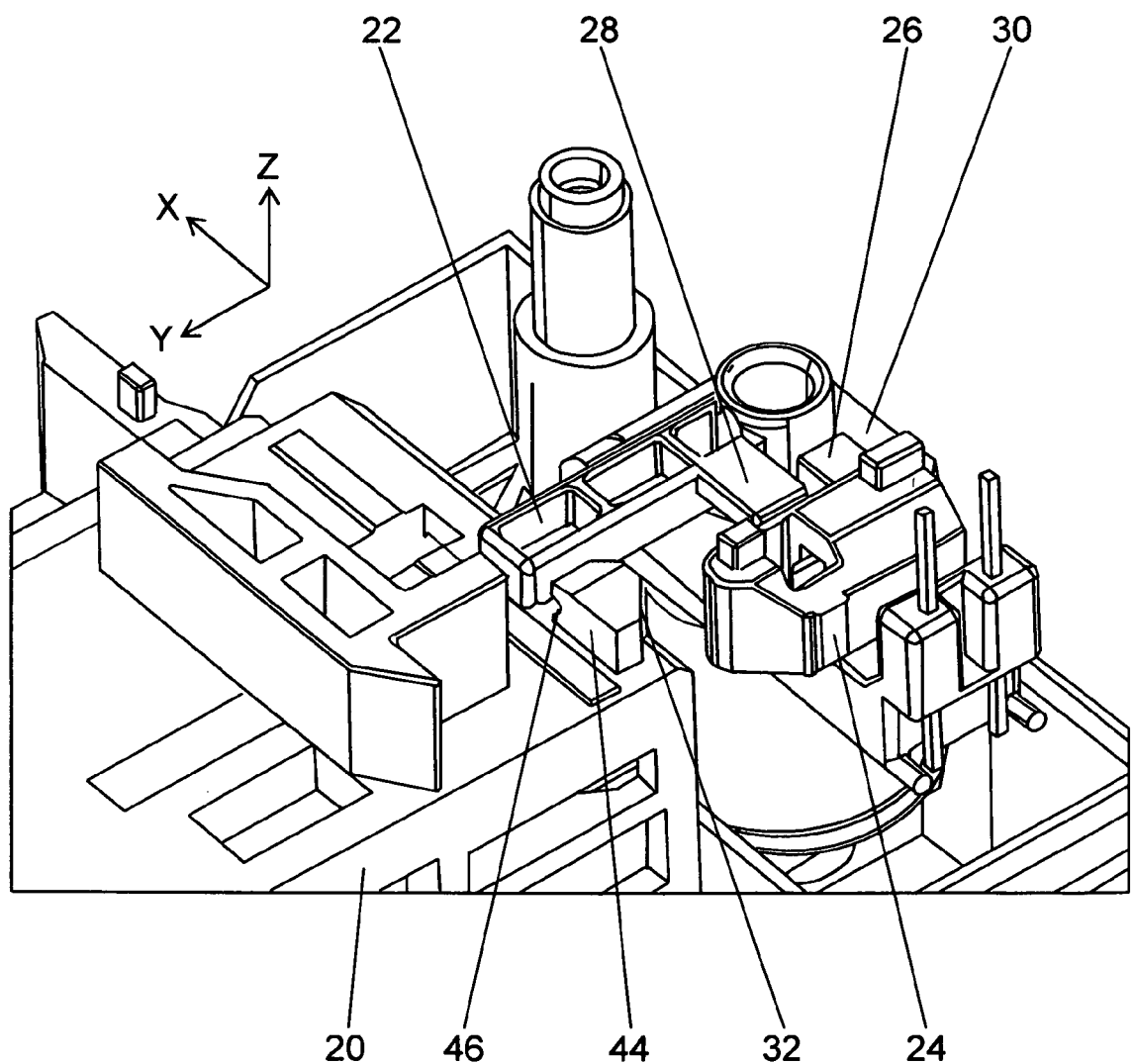
FIG. 8 is a partial diagrammatic perspective view of the electronic ignition lock according to the invention in a fourth operating position.

FIG. 8 is a partial diagrammatic perspective view of the electronic ignition lock 12 according to the invention in a fourth operating position. The latch bar 22 is in its lowered position and abuts against the locking cam 44 of the carrier element 20 and thus blocks a movement of the carrier element 20 towards the opening 18 of the ignition lock 12. Thus an ignition key which is held by the carrier element 20 cannot be removed from the ignition lock 12. The slide bar 24 which has been pushed away from the carrier element 20 by the cam surface 32 of the locking cam 44 is in its unblocking position, allowing the latch bar 22 to be in the latching position (lowered position). In case the latch bar 22 is again lifted by the electromagnet 30 to its raised position, i.e. its unlatching position, the carrier element 20 would again be movable toward the opening 18 and the spring-loaded slide bar 24 would move towards the carrier element 20 into its blocking position such that the lateral arm 26 of the slide bar 24 would again be positioned underneath the lateral arm 28 of the latch bar 22 blocking a downward movement of the latch bar 22. This would then allow a removal of the ignition key 14 from the ignition lock 12.

The ignition lock system 10 functions according to the following principle. In the so-called pre-latching position in which the ignition key 14 is securely held in the ignition lock system 10 but no electrical contact has been established yet, the slide bar 24 is pre-tensioned in a direction toward the carrier element 20. The pre-tensioning of the slide bar 24 is achieved by spring-loading the slide bar 24. The latch bar 22, which is lifted by the electromagnet 30, is pre-tensioned in a downward direction, i.e. in the direction of latching the carrier element 20 and preventing the carrier element 20 from being moved toward the opening 18. In the pre-latching state, the latching of the carrier element 20 is however prevented because, as described above and as shown in FIGS. 5 and 6, the slide bar 24 is positioned under the latch bar 22 and prevents the pre-tensioned latch bar 22 from moving downward.

When the ignition key 14 is inserted into the ignition lock 12 and held in the carrier element 20, at first the latch bar 22 and the slide bar 24 are not affected. On its way from the so-called "S-contact position," which allows activating for example only the stereo system but no other electronic communication in the vehicle, to the so-called "terminal 15 position," which allows an activation of all electric and electronic subsystems of the vehicle, the carrier element 20 displaces the slide bar 24 in the direction that is indicated by an arrow 40 in FIG. 7. More specifically, the cam surface 32 of the locking cam 44 on the carrier element 20 pushes against the cam surface 36 of the slide bar 26 and pushes the slide bar 24 in the direction of the arrow 40. When the slide bar 24 is at its position of maximum displacement, which is a position just prior to the carrier element reaching the so-called terminal 15 position, then the slide bar 24 and the latch bar 22 are no longer mechanically overlapping, i.e. the lateral arm 26 of the slide bar 24 is no longer positioned underneath the lateral arm 28 of the latch bar 22. The latch bar 22, which is pre-tensioned due to a spring-loading, then moves downward and mechanically latches the carrier element 20 and thus the ignition key 14. The ignition key 14 is then mechanically locked in the electronic ignition lock 12 and can no longer be removed from the ignition lock 12.

After stopping the engine of the vehicle, the carrier element 20 is moved in a direction toward the opening 18, i.e. toward the so-called S-contact position. If the conditions for unlocking the key removal lock mechanism and thus for removal of the ignition key 14 from the ignition lock 12 are not met, then the carrier element 20 is locked by the latch bar 22 which is being pushed down by a spring force. If the carrier element 20 is in the proper position, the so-called S-contact position, then the spring-loaded slide bar 24 can be moved again in the direction of arrow 40 by raising the latch bar 22. Once the latch bar 22 is raised by providing an electric current to the electromagnet 30, the lateral arm 26 of the slide bar 24 moves under the lateral arm 28 of the latch bar 22. The latch bar 22 is then in a mechanically stable position. The key removal lock mechanism is unlocked and the ignition key 14 can be removed from the ignition lock 12. In summary, the ignition lock 12 with the above-described key removal lock mechanism automatically locks the ignition key 14 when the ignition key 14 is inserted into the electronic ignition lock 12 and the ignition key 14 is only released by providing an electric current pulse to the electromagnet 30 which operates as a lifting magnet 30 for the latch bar 22. No continuous electrical current to the electromagnet 30 is required in order to lock the ignition key 14 in the ignition lock 12. The ignition key 14 cannot be removed without providing an electric current to the electromagnet 30. The key removal lock mechanism of the ignition lock 12 thus meets motor vehicle safety standards that require a mechanical locking of the ignition key 14 when the ignition lock is in an "on" position or "on" status. Also, the electronic ignition lock 12 is energy efficient because no continuous current is required to lock the ignition key 14. Only a short current pulse for the electromagnet 30 is needed to release the ignition key 14.

The ignition lock system 10 automatically latches the electronic ignition key 14 mechanically when the ignition key 14 is inserted into the ignition lock 12 such that the ignition key is securely held in the ignition lock 12 and cannot be removed from the ignition lock 12 accidentally or by force when the ignition lock 12 is in an "on" state. The ignition key 14 is released when an electric current impulse is provided to the electromagnet 30. Alternative embodiments of the ignition lock 12 based on the principle of mechanically locking the latch bar 22 in its unlatching position are possible. For example, rather than positioning the slide bar 24 laterally adjacent to the latch bar 22, the slide bar 24 could be positioned substantially entirely underneath the latch bar 22 such that when the slide bar is in its unblocking position, the slide bar fits into a recess formed in the latch bar.

Figure 9:
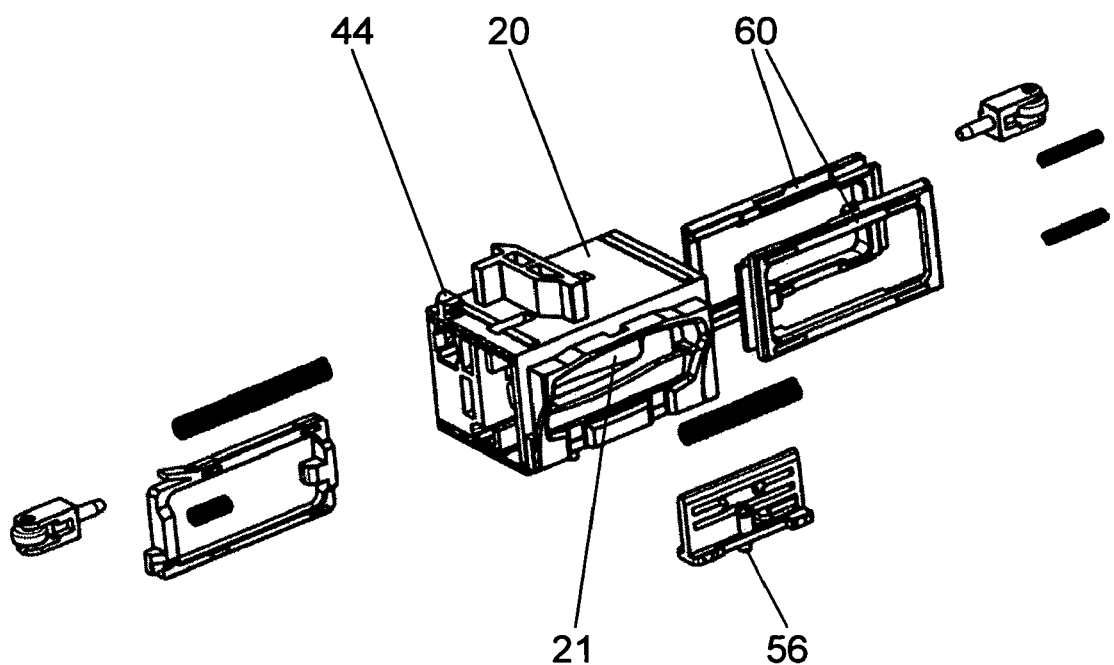
FIG. 9 is a diagrammatic exploded view of the carrier element of the electronic ignition lock according to the invention.

FIG. 9 is a diagrammatic exploded perspective view of the carrier element 20 of the electronic ignition lock 12 according to the invention. The carrier element 20 has an opening 21 through which the front portion 15 of the ignition key 14 is inserted. The slide frames 60 operate to hold the ignition key 12 in the carrier element 20. The guide pin 56 mounted to the carrier element 20 is transversely movable and runs in a corresponding guiding groove 58 provided underneath the carrier element 20.

Figure 10:
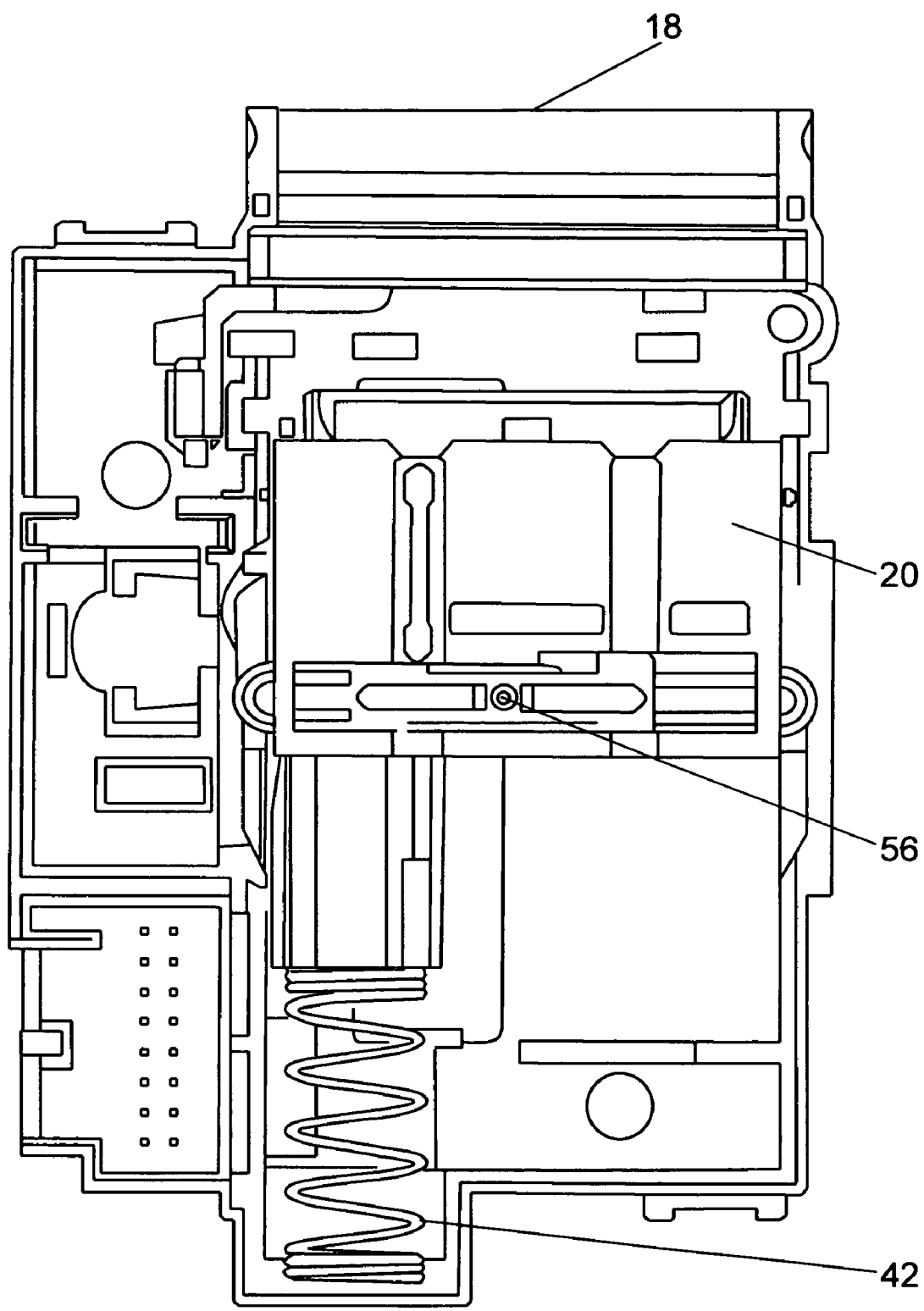
FIG. 10 is a diagrammatic bottom plan view of a part of the electronic ignition lock according to the invention with a bottom portion of the housing removed for illustrating a given position of a carrier element.

FIG. 10 is a diagrammatic bottom plan view of the electronic ignition lock 12 according to the invention with a bottom portion of the housing 13 removed for illustrating the carrier element 20 in a position near the opening 18 of the ignition lock 12 through which the ignition key 14 is inserted. The carrier element 20 has a transversely movable pin 56 which is guided in guiding grooves 58. The guiding groove 58 is shaped such that the movement of the carrier element 20 and thus the movement of the ignition key 14 is controlled when the ignition key 14 is inserted into the ignition lock 12. A coil spring 42 is compressed when the ignition key is inserted and the carrier element 20 moves away from the opening 18.

Figure 11:
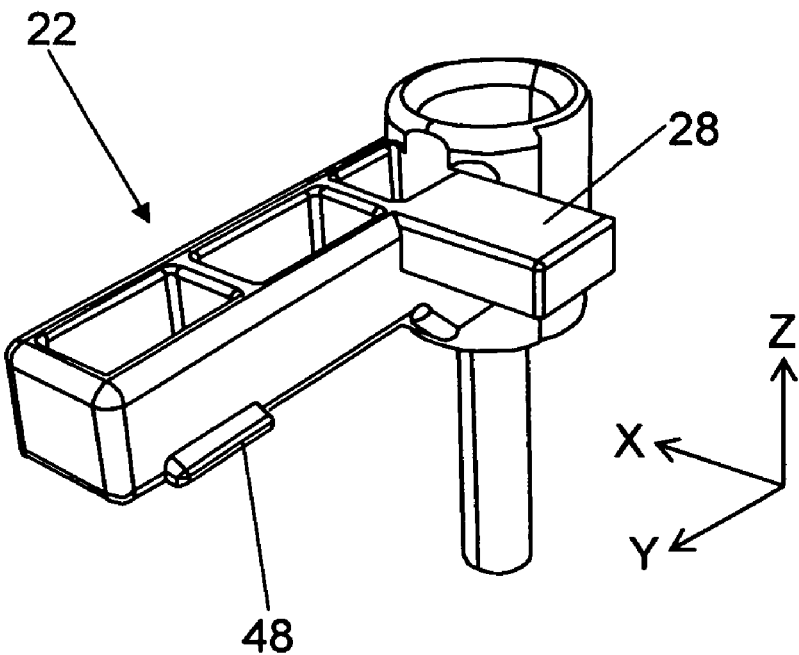
FIG. 11 is a diagrammatic perspective view of a first embodiment of a latch bar of the electronic ignition lock according to the invention.

FIG. 11 is a diagrammatic perspective view of a first embodiment of the latch bar 22 of the electronic ignition lock 12 according to the invention. The latch bar 22 has a tooth 48 which is configured to engage in a groove 46 formed in the locking cam 44 of the carrier element 20 in order to securely block a movement of the carrier element 20.

Figure 12:
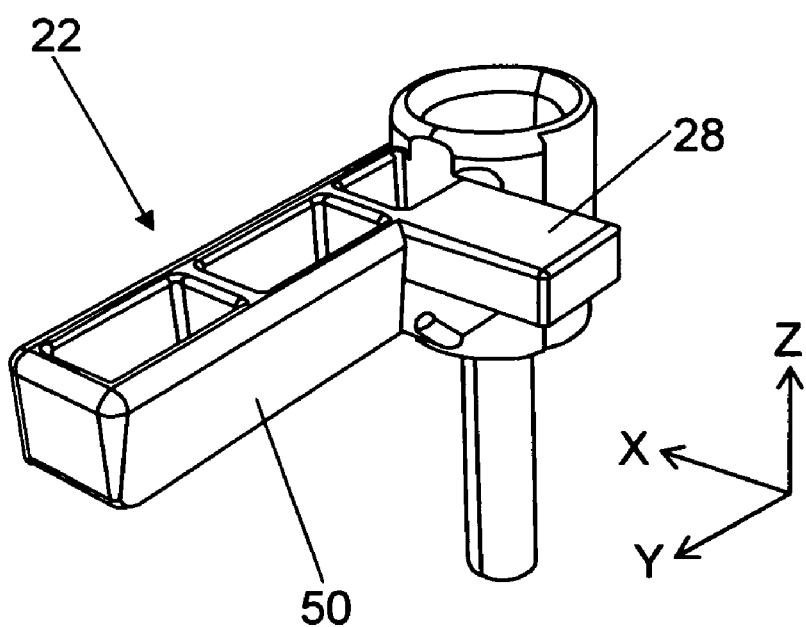
FIG. 12 is a diagrammatic perspective view of a second embodiment of the latch bar of the electronic ignition lock according to the invention.

FIG. 12 is a diagrammatic perspective view of a second embodiment of the latch bar 22 of the electronic ignition lock 12 according to the invention. The second embodiment of the latch bar 22 is formed without a tooth. The contact surface 50 of the latch bar 22 that faces the locking cam 44 is inclined with respect to the Z-axis. In contrast, the first embodiment of the latch bar 22 shown in FIG. 11 has a surface that is parallel to the Z-axis. The locking cam 44 has a corresponding contact surface 52.

Figure 13:
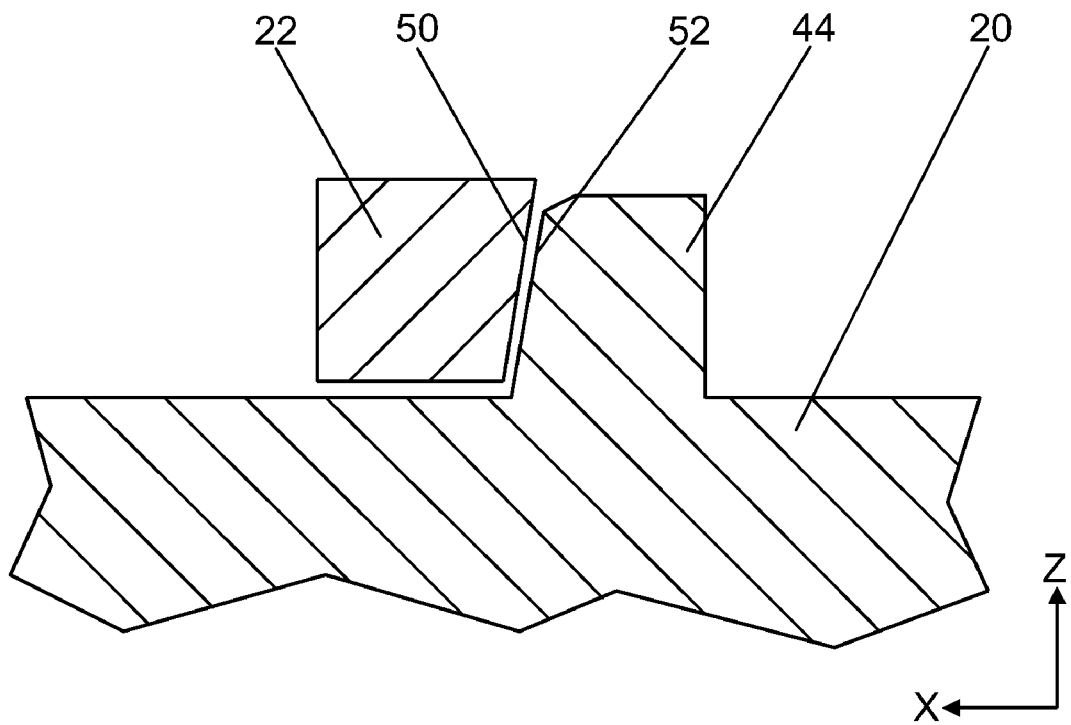
FIG. 13 is a partial diagrammatic sectional view of the second embodiment of the latch bar and the carrier element of the electronic ignition lock according to the invention.

FIG. 13 is a partial diagrammatic sectional view of the second embodiment of the latch bar 22 and the carrier element 20 of the electronic ignition lock 12 according to the invention.

FIG. 13 illustrates the contact surface 50 on the latch bar that is inclined with respect to the Z-axis. The corresponding contact surface 52 of the locking cam 44 is also inclined with respect to the Z-axis.

Figure 14:
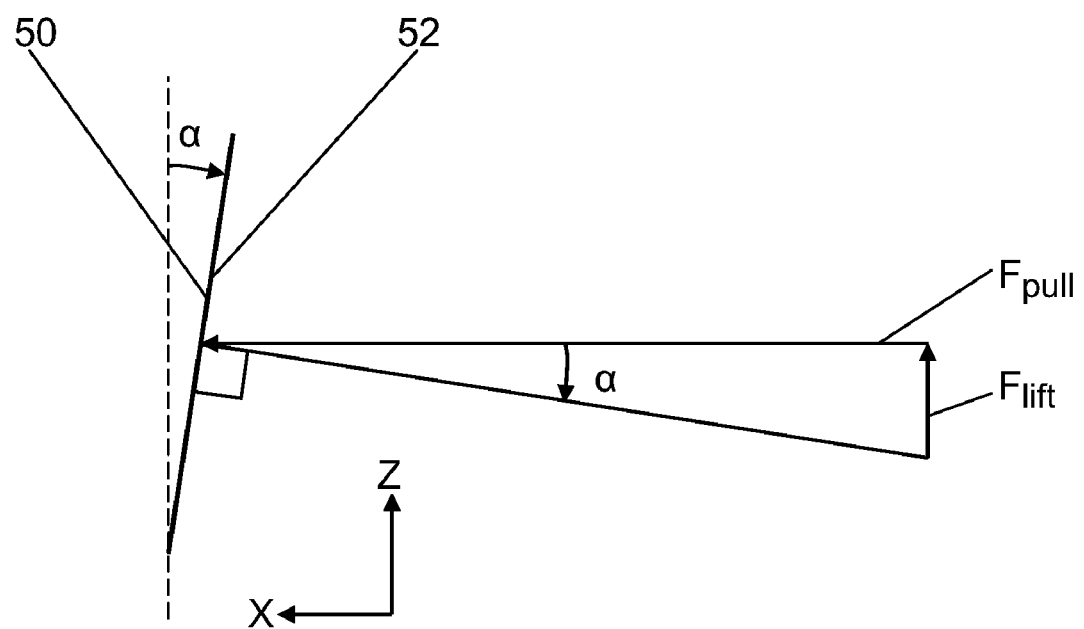
FIG. 14 is an illustration of forces resulting at the contact surfaces of the latch bar and a locking cam of the carrier element in accordance with the invention.

FIG. 14 is an illustration of the forces resulting at the contact surfaces 50, 52 of the latch bar 22 and the locking cam 44 shown in FIG. 13. The contact surface 50 the latch bar 22 and the contact surface 52 of the locking cam 44 are inclined by an angle $\alpha$ with respect to the Z-axis. The pulling force resulting when a vehicle operator tries to pull the electronic key 14 out of the ignition lock 12 is indicated by the arrow labeled $F_{pull}$. Since the contact surfaces 50, 52 are inclined, the pulling force $F_{pull}$ results in a lifting force $F_{lift}$ that is exerted on the latch bar 22. In order to have a self-locking connection between the latch bar 22 and the locking cam 44, the frictional force that is generated at the interface between the contact surfaces 50, 52 must at least equalize the lifting force $F_{lift}$. If the frictional force generated at the interface between the contact surfaces 50, 52 is less than the lifting force $F_{lift}$, then the latch bar 22 is pushed upwards. In case the pulling force $F_{pull}$ and correspondingly the lifting force $F_{lift}$ is large enough, the latch bar 22 may be displaced and the locking cam 44 may slide underneath the latch bar 22 and thus the ignition key 14 could be pulled put of the ignition lock 12. The following equations define the conditions for a self-locking connection between the latch bar 22 and the locking cam 44.

If there were no friction between the contact surfaces 50, 52, then the following equation would define the forces at the latch bar 22.

$$F_{lift} = F_{pull} \cdot \tan(\alpha)$$ Equation (1)

$F_{pull}$ is the pulling force in the direction of the X-axis that the locking cam 44 exerts on the latch bar 22. $F_{lift}$ is the lifting force in the direction of the Z-axis that the locking cam 44 exerts on the latch bar 22. The angle $\alpha$ is the angle by which the contact surfaces 50, 52 are inclined with respect to the Z-axis.

With frictional forces between the contact surfaces 50, 52, the following equation defines the forces at the contact surfaces 50, 52.

$$F_{lift} = F_{pull} \cdot \tan(\alpha - \rho)$$ Equation (2)

The angle $\rho$ is the so-called friction angle, i.e. the angle between the resulting force on the contact surfaces 50, 52 that is generated by the pulling force $F_{pull}$ and a normal axis on those surfaces 50, 52. The condition for a self-locking connection is that the lifting force $F_{lift}$ be zero. The angle $\alpha$ must therefore be equal to the friction angle $\rho$ for a self-locking connection. The friction coefficient $\mu$ in a situation as shown in FIG. 14 is equal to tan ($\rho$), which means that the friction angle $\rho$ is equal the inverse tangent or arc tangent of the friction coefficient $\mu$. The conditions for a self-locking connection are therefore expressed by the following equations:

$$F_{lift} = 0$$ Equation (3)

$$\alpha = \rho$$ Equation (4)

$$\rho = \arctan(\mu)$$ Equation (5)

In case the coefficient of friction is selected to be $\mu = 0.1$, then the resulting self-locking angle $\alpha$ and respectively $\rho$ is equal to 5.7 degrees.

The above-described ignition key removal lock meets the requirements of motor vehicle safety standards that require a mechanical locking of the ignition key 14 when the ignition lock is in an "on" position or "on" state. More specifically, motor vehicle safety standards require an ignition key removal lock when the ignition key is inserted and is between a first position or state, the so-called terminal S-contact, and a second position or state, the so-called terminal 15 contact when terminal 15 is activated. When the gear shift lever is in a park position and the ignition key is pulled from the second position (terminal 15) to the first position (S-contact), the ignition key removal lock is unlocked by activating the electromagnet 30 and the ignition key 14 can be removed from the ignition lock 12.

In some instances, when a user forcefully pulls on the ignition key 14 or forcefully pulls on the key ring connected to the ignition key 14, it may be possible that the mechanical parts of the ignition lock 12 become strained or distorted and the ignition lock 12 may become jammed and cannot release the ignition key 14 even if an electric current is provided to the electromagnet 30 for raising the latch bar 22 triggered by a falling edge of terminal 15. This is in particular a problem when a latch bar as shown in FIG. 11 is used. Forcefully pulling on the ignition key 14 may in some cases result in an undefined status of the electronic ignition lock system 10 and may affect the operation of the ignition lock system 10. In order to prevent a jamming of the ignition key removal lock mechanism when the ignition key 14 is pulled with force, a latch bar 22 without a tooth as illustrated in FIG. 12 is used.

A preferred embodiment of a latch bar 22 with an inclined contact surface 50 as shown in FIG. 12 prevents a possible jamming in case of excessive force being used on the ignition key 14 because the latch bar 22 does not have a tooth that may cause jamming. Providing the contact surface 50 of the latch bar 22 and the corresponding contact surface 52 on the locking cam 44 such that the angle of inclination $\alpha$ meets the self-locking condition as expressed in equations (1) to (5), it is possible to meet the requirements of a reliable ignition key removal lock mechanism and at the same time to prevent a distortion and jamming of the ignition key removal lock mechanism. Thus the ignition lock 12 provides a reliable ignition key removal lock mechanism even if a user accidentally or purposely uses excessive force.

LIST OF REFERENCE NUMERALS 10 electronic ignition lock system
12 electronic ignition lock
13 housing
14 electronic ignition key
15 front portion the electronic ignition key
16 receptacle for holding carrier element
18 opening in ignition lock for inserting ignition key
20 carrier element
21 opening in carrier element for inserting ignition key
22 latch bar
24 slide bar
26 lateral arm of slide bar
28 lateral arm of latch bar
30 electromagnet
32 cam surface of locking cam
36 cam surface of slide bar
40 arrow indicating movement of slide bar
42 coil spring
44 locking cam
46 groove formed in locking cam
48 tooth on latch bar
50 contact surface the latch bar
52 contact surface the locking cam
56 guide pin
58 guiding grooves
60 slide frame for holding ignition key
P0, P1, P2, P3, P4 positions of the electronic ignition key

We claim:

1. An ignition lock comprising:
   an ignition lock housing;
   a carrier element disposed in said ignition lock housing and configured to hold an ignition key, said ignition lock housing defining a longitudinal axis, said carrier element being movable along the longitudinal axis;
   a slide bar disposed in said ignition lock housing, said slide bar being movable in a direction transverse to the longitudinal axis between a blocking position and an unblocking position, said carrier element and said slide bar being configured such that said carrier element displaces said slide bar from the blocking position to the unblocking position when said carrier element moves along the longitudinal axis;
   a latch bar disposed in said ignition lock housing, said latch bar being movable in a direction transverse to the longitudinal axis between a latching position and an unlatching position, said carrier element and said latch bar being configured such that said latch bar, when in the latching position, restricts a movement of said carrier element along the longitudinal axis, and said latch bar, when in the unlatching position, releases said carrier element allowing said carrier element to move along the longitudinal axis; and
   said latch bar and said slide bar being configured such that when said latch bar is in the unlatching position and said slide bar is in the blocking position, said slide bar prevents said latch bar from moving from the unlatching position to the latching position.

2. The ignition lock according to claim 1, wherein:
   said carrier element has at least a first position and a second position along the longitudinal axis, said carrier element moves from the first position to the second position when the ignition key is inserted into said ignition lock; and
   said carrier element and said slide bar each have a cam surface, said cam surface of said carrier element contacts said cam surface of said slide bar when moving from the first position to the second position and pushes said slide bar from the blocking position to the unblocking position for allowing said latch bar to move from the unlatching position to the latching position.

3. The ignition lock according to claim 1, wherein:
   said slide bar is a spring-loaded slide bar exerting a spring force in a direction from the unblocking position to the blocking position; and
   said latch bar is a spring-loaded latch bar exerting a spring force in a direction from the unlatching position to the latching position.

4. The ignition lock according to claim 1, including an electromagnet disposed at said latch bar, said electromagnet being configured as a lifting magnet for moving said latch bar from the latching position to the unlatching position.

5. The ignition lock according to claim 1, wherein:
   said ignition lock housing defines an X-axis, a Y-axis and a Z-axis respectively substantially perpendicular to one another, the longitudinal axis coincides with the X-axis;
   said carrier element is movable in a direction parallel to the X-axis, said slide bar is movable in a direction parallel to the Y-axis between the blocking position and the unblocking position, said latch bar is movable in a direction parallel to the Z-axis between the latching position and the unlatching position; and
   said slide bar and said latch bar each have a lateral arm, said lateral arm of said slide bar obstructs a movement path of said lateral arm of said latch bar when said slide bar is in the blocking position for preventing said latch bar from moving from the unlatching position to the latching position.

6. The ignition lock system according to claim 1, wherein:
   said ignition lock housing defines an X-axis, a Y-axis and a Z-axis respectively substantially perpendicular to one another, the longitudinal axis coincides with the X-axis;
   said carrier element is movable in a direction parallel to the X-axis, said slide bar is movable in a direction parallel to the Y-axis between the blocking position and the unblocking position, said latch bar is movable in a direction parallel to the Z-axis between the latching position and the unlatching position; and
   said latch bar forms one of a force-locking connection and a form-locking connection with said carrier element, when said latch bar is in the latching position and abuts against said carrier element.

7. The ignition lock according to claim 6, wherein:
   said latch bar has a tooth and said carrier element has a locking cam formed with a groove; and
   said tooth of said latch bar engages in said groove of said locking cam for providing a form-locking connection between said latch bar and said carrier element when said latch bar is in the latching position and abuts against said carrier element.

8. The ignition lock according to claim 6, wherein:
   said latch bar and said carrier element each have a substantially flat contact surface, said contact surface of said latch bar and said contact surface of said carrier element extend substantially parallel to one another and lie flat against one another when said latch bar is in the latching position and said latch bar abuts against said carrier element; and said contact surface of said latch bar and said contact surface of said carrier element extend substantially parallel to the Y-axis and a normal on said contact surface of said latch bar is at a given angle to the X-axis, the given angle being at most a self-locking angle selected such that said latch bar, when in the latching position and abutting against said carrier element, forms a force-locking connection with said carrier element and said carrier element cannot exert a lifting force in a direction parallel to the Z-axis on said latch bar.

9. An ignition lock comprising:

an ignition lock housing;

a carrier element disposed in said ignition lock housing and configured to hold an ignition key, said ignition lock housing defining a longitudinal axis, said carrier element being movable along the longitudinal axis;

a latch bar disposed in said ignition lock housing, said latch bar being substantially immovable along the longitudinal axis and being movable in a direction transverse to the longitudinal axis between a latching position and an unlatching position, said carrier element and said latch bar being configured such that said latch bar, when in the latching position, restricts a movement of said carrier element along the longitudinal axis, and said latch bar, when in the unlatching position, releases said carrier element allowing said carrier element to move along the longitudinal axis; and said latch bar and said carrier element each having a substantially flat contact surface, said contact surface of said latch bar and said contact surface of said carrier element extending substantially parallel to one another and lying flat against one another when said latch bar is in the latching position and abuts against said carrier element;

said contact surface of said latch bar and said contact surface of said carrier element not lying flat against one another when said latch bar is in the unlatching position; and said contact surface of said latch bar is provided such that a normal on said contact surface of said latch bar is at a given angle to the longitudinal axis, the given angle being greater than zero and being at most a self-locking angle selected such that said latch bar, when in the latching position and abutting against said carrier element, forms a force-locking connection with said carrier element such that said carrier element cannot force said latch bar from the latching position to the unlatching position.

10. The ignition lock according to claim 9, wherein:

said contact surface of said latch bar and said contact surface of said carrier element define a frictional coefficient; and said contact surface of said latch bar is provided such that the given angle between the longitudinal axis and the normal on said contact surface of said latch bar is at most the arcustangens of the frictional coefficient.

11. A method of operating an ignition lock system, the method which comprises:

providing an ignition lock including an ignition lock housing;

providing an ignition key configured to be inserted into the ignition lock;

providing a carrier element disposed in the ignition lock housing, the ignition lock housing defining a longitudinal axis, the carrier element being movable along the longitudinal axis, the ignition key moving together with the carrier element along the longitudinal axis when the ignition key is inserted into the ignition lock;

providing a slide bar disposed in the ignition lock housing, the slide bar being movable in a direction transverse to the longitudinal axis between a blocking position and an unblocking position, the carrier element and the slide bar being configured such that the carrier element displaces the slide bar from the blocking position to the unblocking position when the carrier element moves along the longitudinal axis;

providing a latch bar disposed in the ignition lock housing, the latch bar being movable in a direction transverse to the longitudinal axis between a latching position and an unlatching position, the carrier element and the latch bar being configured such that the latch bar, when in the latching position, restricts a movement of the carrier element along the longitudinal axis, and the latch bar, when in the unlatching position, releases the carrier element allowing the carrier element to move along the longitudinal axis;

the latch bar and the slide bar being configured such that when the latch bar is in the unlatching position and the slide bar is in the blocking position, the slide bar prevents the latch bar from moving from the unlatching position to the latching position;

inserting the ignition key into the ignition lock and moving the carrier element to a first position;

further inserting the ignition key and moving the carrier element from the first position to a second position and displacing the slide bar in a direction transverse to the longitudinal axis by moving the carrier element from the first position to the second position for unblocking the latch bar; and moving the latch bar from the unlatching position to the latching position by using a spring-loading of the latch bar.

12. The method of operating an ignition lock system according to claim 11, which comprises:

supplying an electric current to an electromagnet operating as a lifting magnet for moving the latch bar from the latching position to the unlatching position; and moving the slide bar from the unblocking position to the blocking position by using a spring-loading of the slide bar.

* * * * *

UNITED STATES PATENT AND TRADEMARK OFFICE
CERTIFICATE OF CORRECTION

PATENT NO. : 7,617,708 B2
APPLICATION NO. : 11/495025
DATED : November 17, 2009
INVENTOR(S) : Frohne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this

Fourteenth Day of December, 2010

David J. Kappos
*Director of the United States Patent and Trademark Office*